(12) United States Patent
Shmueli (10) Patent No.: US 9,950,915 B2
(45) Date of Patent: Apr. 24, 2018

(54) WINCH SYSTEM

(71) Applicant: RT LTD., Yavne (IL)

(72) Inventor: Rami Shmueli, Tel Aviv (IL)

(73) Assignee: RT LTD., Yavne (IL)

( * ) Notice: Subject to any disclaimer, the term of this patent is extended or adjusted under 35 U.S.C. 154(b) by 282 days.

(21) Appl. No.: 14/722,177

(22) Filed: May 27, 2015

(65) Prior Publication Data

US 2016/0347594 A1    Dec. 1, 2016

(51) Int. Cl.
| B66D 1/26 | (2006.01) |
| B66D 1/74 | (2006.01) |
| B66D 1/76 | (2006.01) |
| B64F 1/14 | (2006.01) |
| B64F 3/00 | (2006.01) |

(52) U.S. Cl.
CPC ............... B66D 1/741 (2013.01); B64F 1/14 (2013.01); B64F 3/00 (2013.01); B66D 1/74 (2013.01); B66D 1/76 (2013.01)

(58) Field of Classification Search
CPC ... B66D 1/02; B66D 1/10; B66D 1/12; B66D 1/20; B66D 1/24; B66D 1/26; B66D 1/36; B66D 1/48; B66D 1/485; B66D 1/50; B66D 1/68; B66D 1/74; B66D 1/7405; B66D 1/741; B66D 1/7447; B66D 1/7489; B66D 1/76; B66D 2700/0108
See application file for complete search history.

(56) References Cited

U.S. PATENT DOCUMENTS

| 3,717,325 | A | * | 2/1973 | Peterson | ............... B66D 1/741 212/71 |
| 4,234,167 | A | * | 11/1980 | Lane | ........................ B66D 1/50 254/291 |
| 4,236,696 | A | * | 12/1980 | Hicks | ..................... B66D 1/741 254/297 |
| 4,526,050 | A | * | 7/1985 | Johnson | ............. F16H 19/0672 74/506 |
| 4,721,285 | A | * | 1/1988 | McMichael | ......... B66D 1/7447 226/175 |

(Continued)

FOREIGN PATENT DOCUMENTS

| CN | 1021355651 B | 7/2012 |
| CN | 103663222 A | 3/2014 |

(Continued)

*Primary Examiner* — Emmanuel M Marcelo
(74) *Attorney, Agent, or Firm* — Mark M. Friedman (57) ABSTRACT

A winch system for controlling the elevation of an aerostats restrained by a cable is provided. The system includes a capstan arrangement configured for reducing the tension in a segment of a cable extending between an aerostats side and a drum side thereof; a spool drum configured for wrapping therearound a segment of the cable extending from the drum side of the capstan arrangement; a first drive mechanism configured to selectively activate the capstan arrangement in a released mode, in which the cable is let out towards the aerostats, and a pulling mode in which the cable is pulled in towards the spool drum; and a second drive mechanism configured to rotate the spool drum in the released mode and in the pulling mode such that the segment of the cable extending from the drum side of the capstan arrangement is pulled in a counter direction to the direction of the tension exerted on the cable.

20 Claims, 7 Drawing Sheets

(56) References Cited

U.S. PATENT DOCUMENTS

| | | | | |
|---|---|---|---|---|
| 5,009,353 A * | 4/1991 | Alquist | ................. | B66D 3/003 |
| | | | | 226/172 |
| 5,388,781 A * | 2/1995 | Sauber | ................. | B65H 54/02 |
| | | | | 242/365.6 |
| 6,607,182 B1 | 8/2003 | Turco | | |
| 7,175,163 B2 | 2/2007 | Blanc | | |
| 7,429,031 B1 * | 9/2008 | Mitchell | ............. | B66D 1/7494 |
| | | | | 254/214 |
| 2005/0062030 A1 * | 3/2005 | Wentworth | ........... | B66D 1/741 |
| | | | | 254/323 |
| 2008/0069644 A1 * | 3/2008 | Tjader | .................... | B66C 23/66 |
| | | | | 405/184.1 |
| 2010/0067988 A1 * | 3/2010 | Tjader | ................. | F16L 55/1658 |
| | | | | 405/184.3 |
| 2010/0224844 A1 | 9/2010 | Boussaton et al. | | |
| 2013/0020544 A1 * | 1/2013 | Lawson | ............... | B66D 1/7405 |
| | | | | 254/287 |
| 2014/0248089 A1 * | 9/2014 | Thompson | ............... | H02G 1/04 |
| | | | | 405/184.3 |
| 2014/0284531 A1 | 9/2014 | Hoyt | | |
| 2016/0031685 A1 * | 2/2016 | Lawson | .................. | B66D 1/30 |
| | | | | 414/800 |
| 2016/0107867 A1 * | 4/2016 | Alsaker | ................. | B66D 1/741 |
| | | | | 254/327 |

FOREIGN PATENT DOCUMENTS

| | | | | | |
|---|---|---|---|---|---|
| GB | | 627307 A | * | 8/1949 | ............ B66D 1/741 |
| GB | | 2434352 A | * | 7/2007 | ............... B66D 1/36 |

* cited by examiner

WINCH SYSTEM

TECHNOLOGICAL FIELD

The presently disclosed subject matter relates to a winch system in general and in particular to a winch system for controlling the elevation of an aerostats.

BACKGROUND

A winch is a mechanical device that is used to pull in (wind up) or let out (wind out) or otherwise adjust the tension of a rope or wire rope (also called "cable" or "wire cable"). In its simplest form it consists of a spool and attached hand crank. In larger forms, winches stand at the heart of machines as diverse as tow trucks, steam shovels and elevators. The spool can also be called the winch drum. More elaborate designs have gear assemblies and can be powered by electric, hydraulic, pneumatic or internal combustion drives.

US20140284531 discloses an orbital winch having: lower and upper frames; spool having upper and lower flanges with lower flange attached to lower frame; axial tether guide mounted to upper frame; secondary slewing ring coaxial with spool and rotatably mounted to upper frame, wherein secondary slewing ring's outer surface has gearing; upper tether guide mounted to inner surface of secondary slewing ring; linear translation means having upper end mounted to upper frame and lower end mounted on lower frame; primary slewing ring rotatably mounted within linear translation means allowing translation axially between flanges, wherein primary slewing ring's outer surface has gearing; lower tether guide mounted on primary slewing ring's inner surface; pinion rod having upper end mounted to upper frame and lower end mounted to lower frame, wherein pinion rod's teeth engage primary and secondary stewing rings' outer surface teeth; and tether passing through axial, upper, and lower tether guides and winding around spool.

CN103663222 discloses an electric winch control device and method for winding and unwinding photoelectric composite cables for load bearing. The control device comprises a control unit, a friction winch brake resistor, a friction winch frequency converter, a friction winch, a friction winch signal detection unit, an industrial personal computer, an alternating current power supply, a storage winch frequency converter, a storage winch brake resistor and a storage winch. According to the method for winding and unwinding cables for load bearing, the variable-frequency regulating speed technology is adopted, combined with the control device, and therefore closed-loop control of the friction winch and the storage winch and synchronous control of the friction winch and the storage winch are achieved. Meanwhile, due to detection of various signals, safety of system operation is improved.

U.S. Pat. No. 6,607,182 discloses a winching arrangement is disclosed for winching a cable comprising a winching frame; a capstan for winding the cable onto; a drive motor for driving the capstan; and a first clutch mechanism for disengaging the capstan from the clutch when the torsional load on the cable exceeds a first predetermined limit. Preferably, the first clutch mechanism is located within the capstan and ideally the clutch mechanism is an adjustable cone clutch mechanism. The winching arrangement can further include a second adjustable clutch mechanism located adjacent the motor for providing secondary disengagement of the motor from the capstan when the cable exceeds a second predetermined limit. Further, a gear reducer can be interconnected between the capstan and the drive motor.

U.S. Pat. No. 7,175,163 discloses a so-called capstan winch comprising drums driving a cable and provided with a peripheral wall around which are strung independent peripheral rings. Said rings are provided with a peripheral groove designed to receive the cable and are made of an elastic material so as to allow both the cable to be driven and a relative sliding movement between the peripheral rings and the peripheral wall, the relative sliding movement being of amplitude substantially equal to longitudinal deformation of the cable, when it is subjected to tension stresses. The two drums can be axially offset relative to each other and their axes of rotation, may form a non-null angle of inclination.

US20100224844 discloses a winch for pulling a cable for maneuvering a load is composed of two motorized drums each including an active cylindrical peripheral surface equipped with several annular grooves, the cable intended to be wound around the two drums according to a helical arrangement. The motorized drums are each formed from at least three pulleys, that can each be rotated around a common central axis, cooperating with their own dedicated motor element and including a cylindrical peripheral surface equipped with at least one of the grooves: two pulleys known as outer pulleys, positioned between which is at least one pulley known as a central pulley. The central pulleys include at least one axial cylindrical extension, the cylindrical peripheral surface of which constitutes a rotation bearing for the central cylindrical surface of at least one of the other pulleys.

CN102135651 discloses an optical fiber micro cable withdrawing and releasing winch, which comprises a direct current torque motor, a winding drum, a tensioning mechanism and a cable arrangement mechanism, wherein the winding dram is connected with an output shaft of the direct current torque motor; the tensioning mechanism comprises a movable pulley, a fixed pulley A and a fixed pulley B; the movable pulley is arranged on a bracket with a spring device; and the optical fiber micro cable is wound and connected to the winding drum through the fixed pulley A, the movable pulley and the fixed pulley B.

GENERAL DESCRIPTION

There is provided in accordance with an aspect of the presently disclosed subject matter a winch system for controlling the elevation of an aerostats restrained by a cable. The system includes a capstan arrangement configured for reducing the tension in a segment of a cable extending between an aerostats side and a drum side thereof; a spool drum configured for wrapping therearound a segment of the cable extending from the drum side of the capstan arrangement; a first drive mechanism configured to selectively activate the capstan arrangement in a released mode, in which the cable is let out towards the aerostats, and a pulling mode in which the cable is pulled in towards the spool drum; and a second drive mechanism configured to rotate the spool drum in the released mode and in the pulling mode such that the segment of the cable extending from the drum side of the capstan arrangement is pulled in a counter direction to the direction of the tension exerted on the cable.

The capstan arrangement can include an aerostats side through which the cable extends towards the aerostats and a drum side through which the cable extends towards the spool drum.

The capstan arrangement can include a dual capstan head having a first head and a second head each having a circumferential surface configured to allow winding the cable thereon, wherein the first head is mounted on a first shaft disposed in parallel with a second shaft on which the second head is mounted.

The first drive in the released mode can be configured to rotate the first and second heads in a first direction such that the cable is pulled, and in the pulling mode can be configured to rotate the first and second heads in a second direction such that the cable is released.

The first and second heads can be consecutively mounted on an elongated frame member extending upwardly in the direction of the cable and being configured to allow an up and down rotation, such that direction of the frame is adjustable in accordance with the location of the aerostats.

The varying forces can be set in accordance with the released mode and the pulling mode, the rotational speed of the first drive mechanism, and a tension measured by a tension sensor.

The first and second heads can include a plurality of guides defined along the circumferential surface, each guide is configured to allow a single cable binding therein. Each of the first and second heads can further include side flanges defined on each edge of the circumferential surface and a roller disposed between the side flanges and configured to engage the cable wounded over the circumferential surface, forcing thereby each bindings of the cable into one of the guides.

The capstan arrangement can include a guiding member disposed at an aerostats side thereof, through which the cable extends towards the aerostats, the guiding member being configured to urge the cable towards a first guide of the first head.

The guiding member can include a main wheel and an auxiliary wheel mounted such that the cable extends between a circumferential surface of the main wheel and that of the auxiliary wheel.

The capstan arrangement can further include a tension sensor configured for measuring an input tension of the cable at an aerostats side thereof.

The spool drum can include a circumferential surface for wrapping the cable thereon and includes a pair of flanges each extend from one edge of the circumferential surface. The spool drum can further include a drum guide configured to direct the cable such that it is aligned with the circumferential surface of the spool drum.

The drum guide can include a guiding wheel disposed such that a segment of the cable extending from a drum side of the capstan arrangement engages a surface thereof and is directed towards the spool drum.

The second drive mechanism can be configured to operate in varying forces such that the spool drum maintains a predetermined tension of a segment of the cable disposed between the spool drum and the drum side of the capstan arrangement.

The segment of the cable can be pulled such that a predetermined tension thereof is maintained in the releasing mode and in the pulling mode.

In the pulling mode the second drive mechanism can be configured to operate such that the cable is wrapped around the spool drum, and in the releasing mode the spool drum is rotated in the direction of the tension forces exerted by the cable.

In the releasing mode the second drive mechanism can exert counterforces on the spool drum such that rotation of the spool drum to release the cable is restrained.

The second drive mechanism can be configured to operate in the releasing mode only in response to a drop of the tension in the segment below a predefined threshold.

The capstan arrangement and the spool drum can be mounted on a rotational mount configured to allow horizontal rotation.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
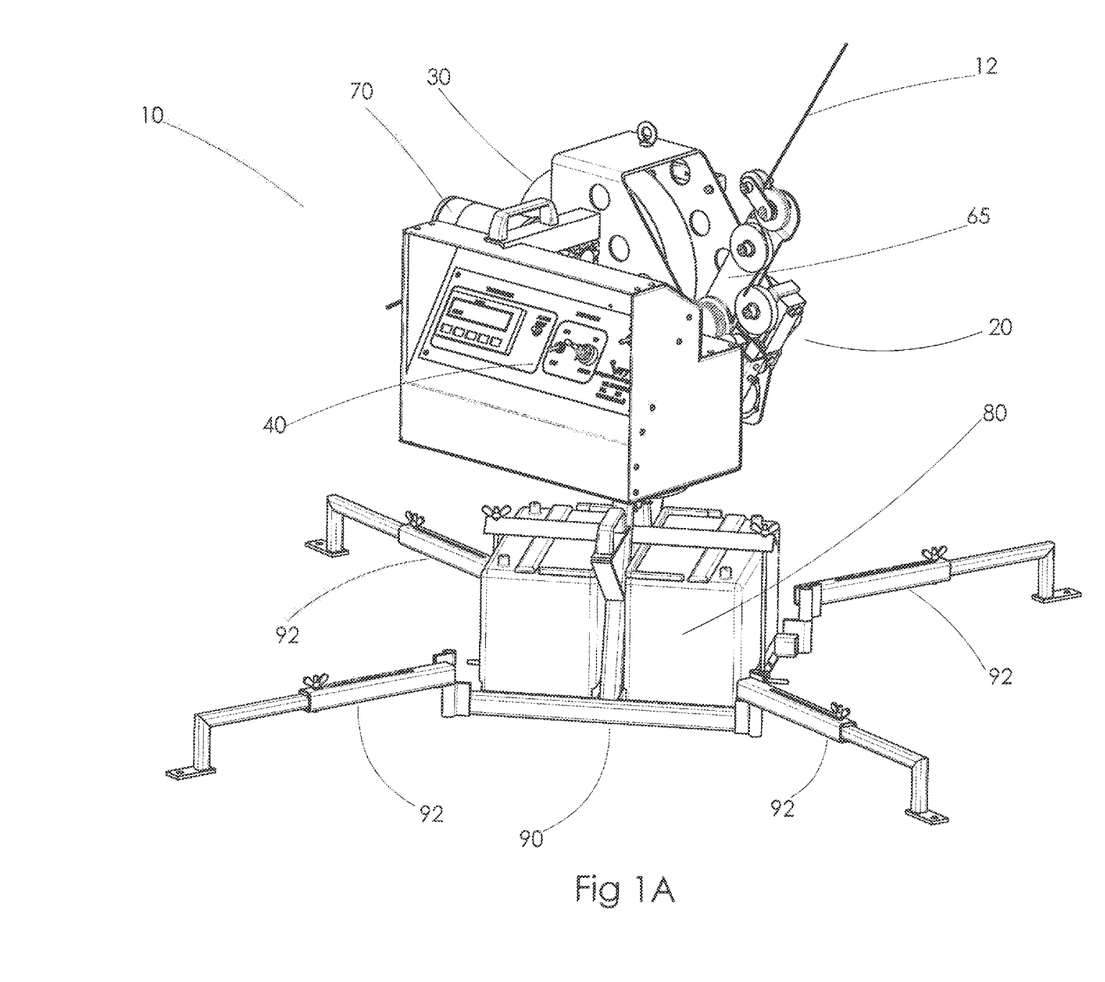
FIG. 1A is a right-side perspective view of a winch system in accordance with an example of the presently disclosed subject matter.
Figure 1B:
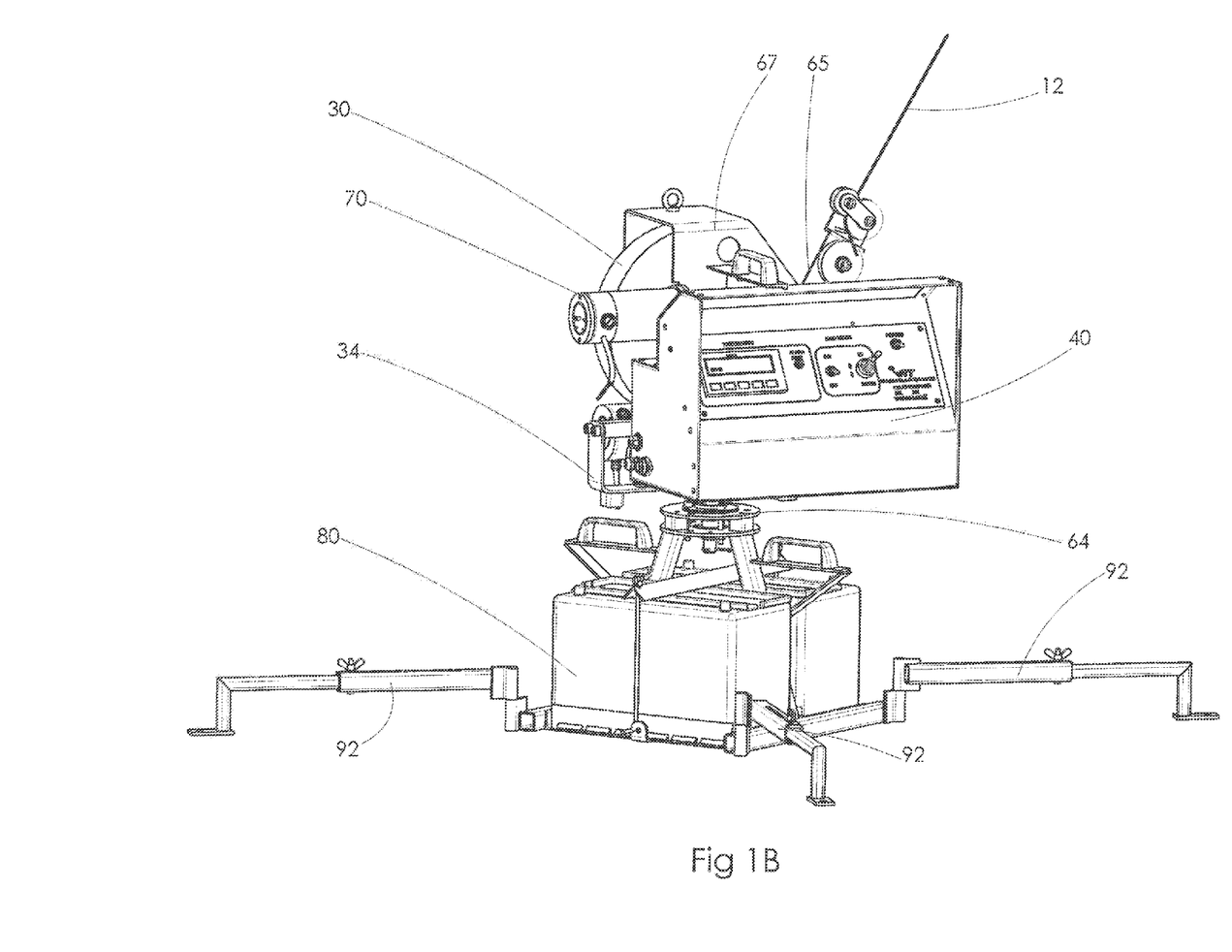
FIG. 1B is a left-side perspective view of the winch system of FIG. 1A.

FIGS. 1A and 1B shows a winch system 10 for controlling the elevation of an aerostats (not shown) restrained by a cable 12, for example a tactical aerostats. The system 10 includes a capstan arrangement 20 configured for reducing the tension of the cable 12 and a spool drum 30 configured for wrapping the cable 12 therearound. According to an example the winch system 10 further includes a control panel 40 and a power source 80 as explained in detail hereinafter.

Figure 2A:
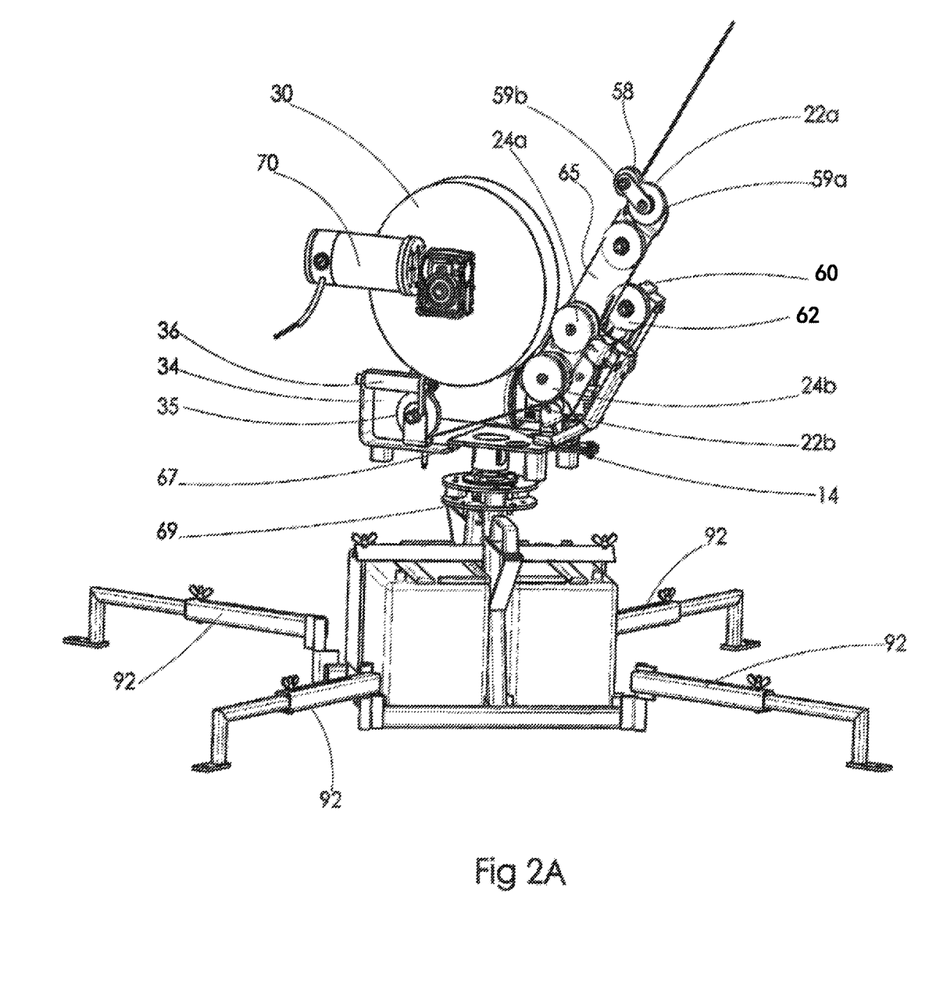
FIG. 2A is a front perspective view of the mechanical portion of the winch system of FIG. 1A.
Figure 2B:
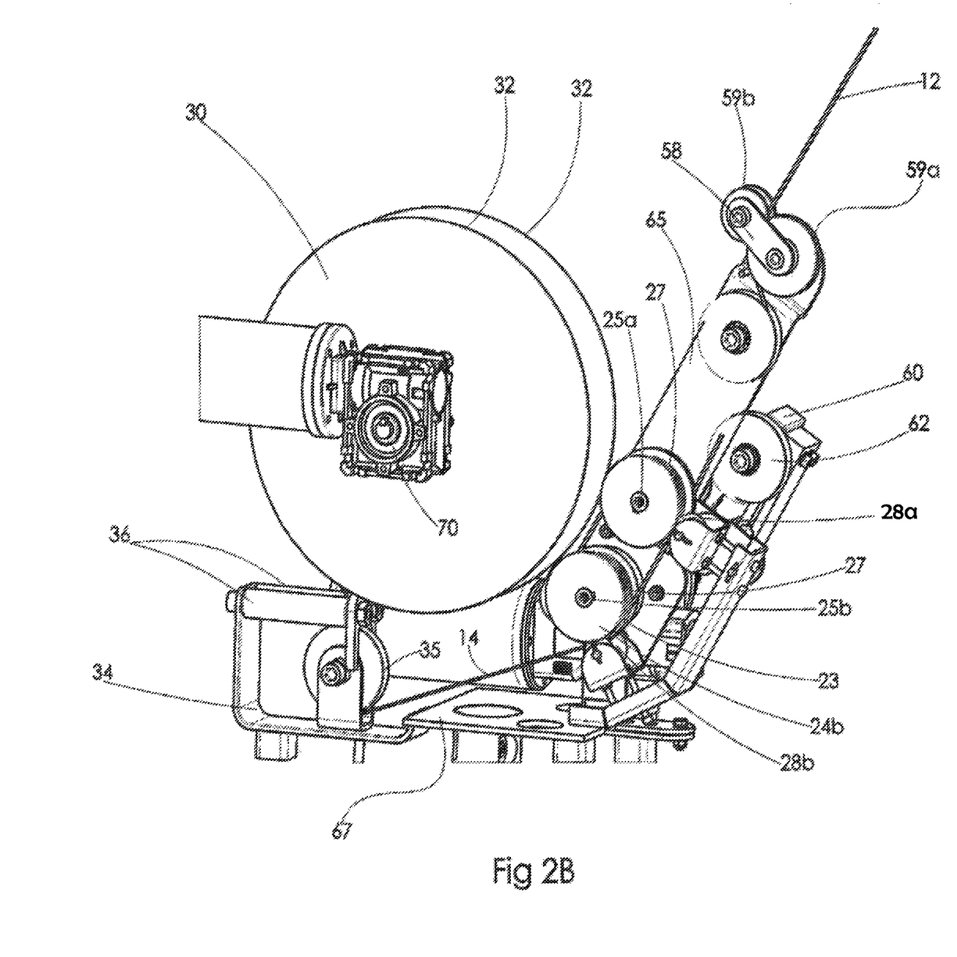
FIG. 2B is an enlarged view of the mechanical portion of FIG. 2A.

Reference is now made to FIGS. 2A and 2B, the capstan arrangement 20 includes an aerostats side 22a through which the cable 12 extends towards the aerostats and a drum side 22b through which the cable 12 extends towards the spool drum 30. The capstan arrangement 20 according to an example can further includes a dual capstan head having a first head 24a and a second head 24b each having a circumferential surface 23 configured to allow winding the cable 12 thereon. The first head 24a is mounted on a first shaft 25a disposed in parallel with a second shaft 25b on which the second head 24b is mounted. The first and second heads 24a and 24b include a plurality of guides 27 defined along the circumference thereof, each guide 27 is configured to allow a single cable binding therein. The cable 12 can thus be bound over the first and second heads 24a and 24b by extending thereof between the first guide 27 of the first head 24a and the parallel guide 27 on the second head 24b. The cable can extend back to the second guide 27 of the first head 24a and to the parallel guide 27 on the second head 24b.

Figure 2C:
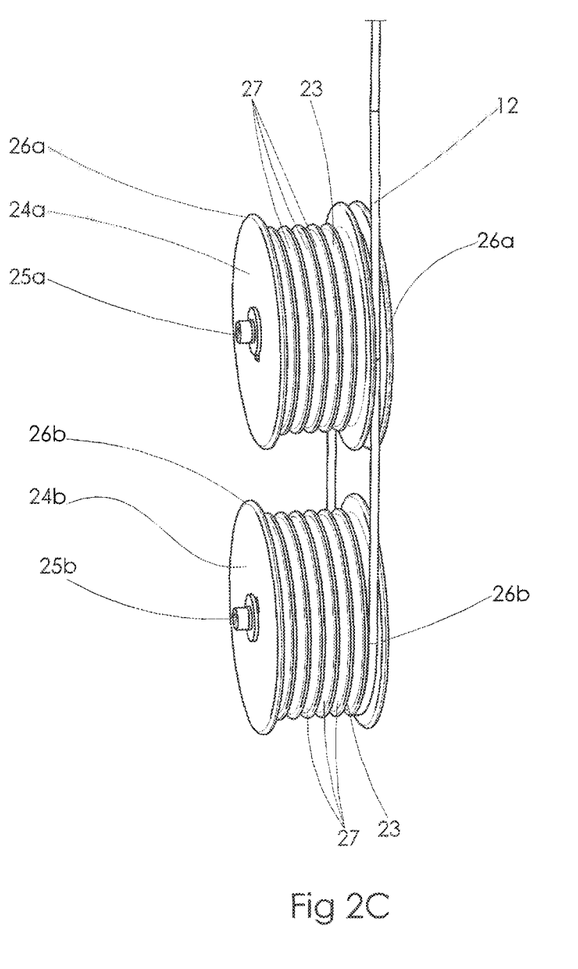
FIG. 2C is a perspective view of the capstan arrangement in accordance with an example of the presently disclosed subject matter.

As best seen in FIG. 2C, each of the first and second heads 24a and 24b can further include side flanges 26a and 26b defined on each edge of the circumferential surface 23 and configured to preclude lateral displacement of the cable wounded on the circumferential surface 23. Each of the first and second heads 24a and 24b can further include a roller 28a and 28b respectively, disposed between the side flanges 26a and 26b and configured to engage the cable 12 wounded over the circumferential surface 23, forcing thereby each bindings of the cable 12 into the respective guide 27.

Since the number of bindings of the cable 12 over the first and second heads 24a and 24b determines the amount of tension reduced by the capstan arrangement 20. Thus, it is appreciated the amount of guides 27 on the first and second heads 24a and 24b can be determined according to the amount of tension it is required to reduce from the cable 12. The capstan arrangement 20 is thus configured reduce the tension in the segment of the cable 12 extending between the aerostats side 22a and a drum side 22b thereof.

Figure 3A:
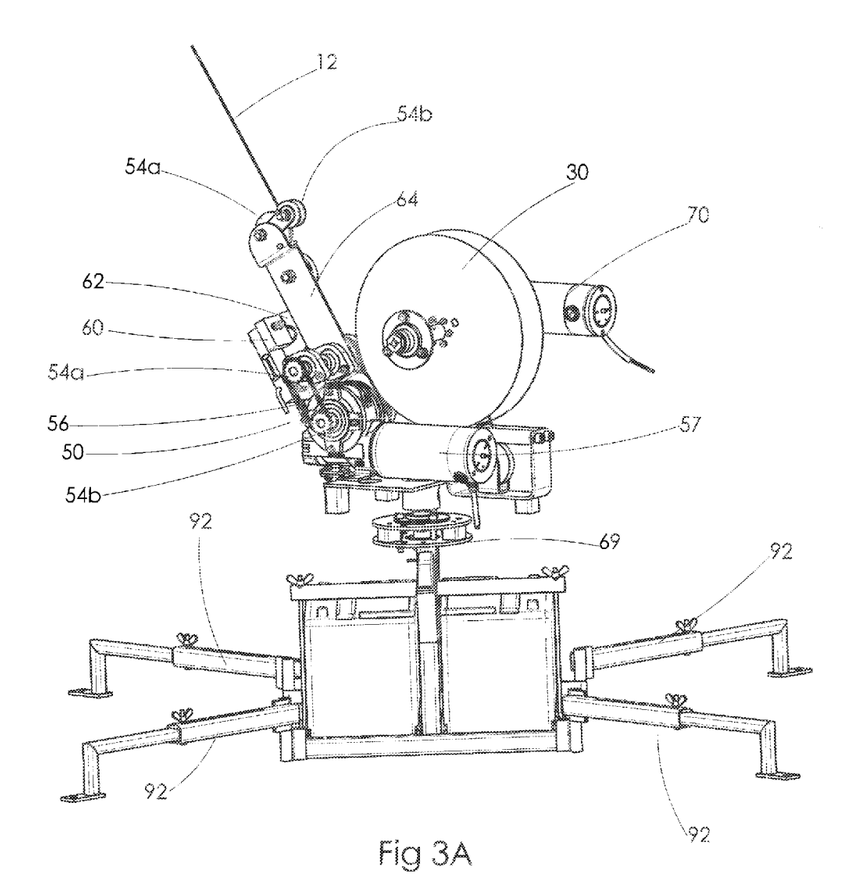
FIG. 3A is a back perspective view of the mechanical portion of the winch system of FIG. 1A; and, FIG. 3B is an enlarged view of the mechanical portion of FIG. 3A.
Figure 3B:
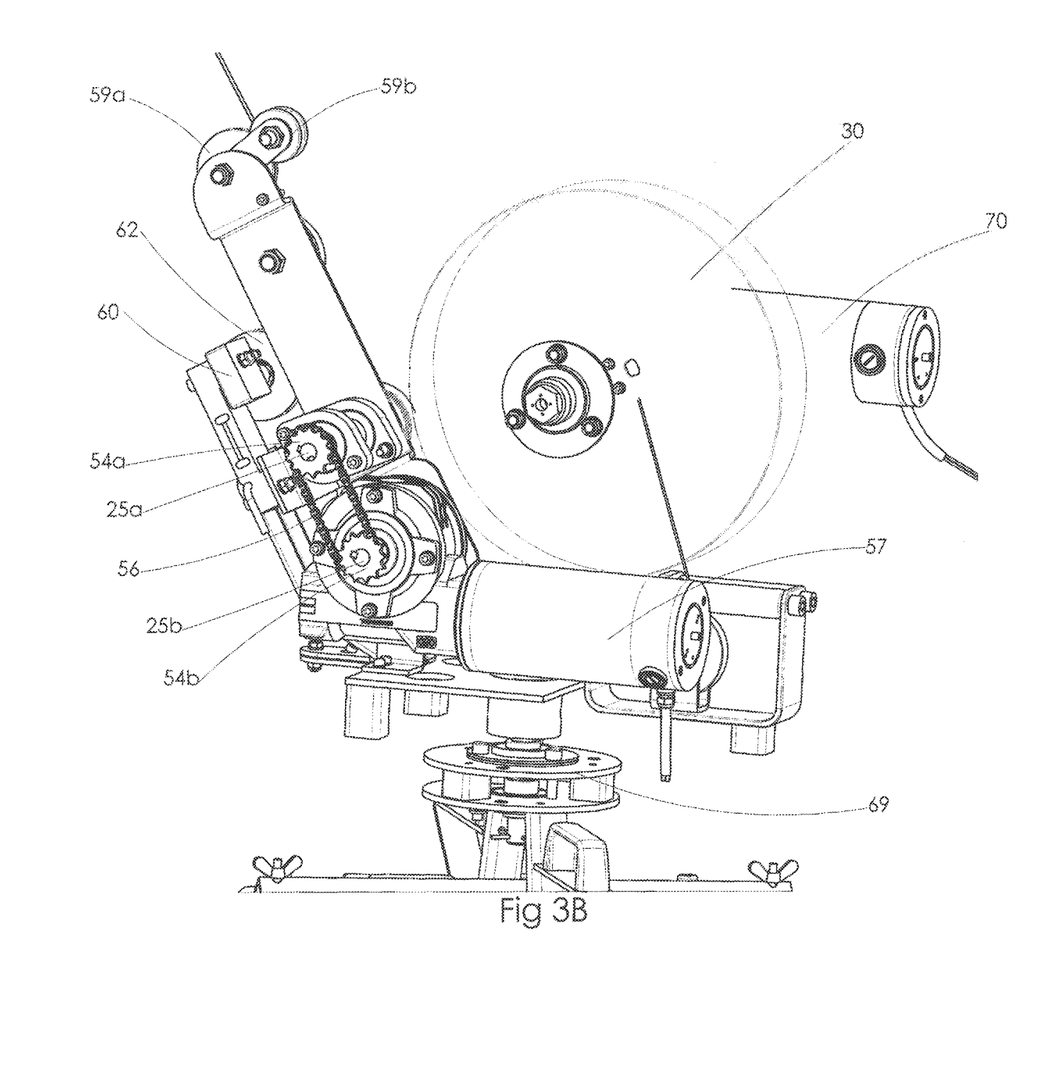

As shown in FIGS. 3A and 3B, the winch system 10 further includes a first drive mechanism 50 configured to selectively activate the capstan arrangement 20 in a releasing mode, in which the cable 12 is let out towards the aerostats, and a pulling mode in which the cable is pulled in towards the spool drum. The first drive mechanism 50 according to the illustrated example includes a first gear 54a mounted on the first shaft 25a configured to drive the first shaft 25a, and a second gear 54b mounted on the second shaft 25b configured to drive the second shall 25b. The first and second gears 54a, 54b are configured to cooperate such that the first and second heads 24a and 24b are rotated at the same speed and the same direction. According to the illustrated example, the first and second gears 54a, 54b are provided with a chain 56 mounted thereon and configured to allow unified rotation thereof.

The first drive mechanism 50 according to the present example includes a motor 57 configured to rotate the second gear 54b, such that the chain 56 allows the rotation of second gear 54b therewith. Alternatively, the first and second gears 54a, 54b can be manually operated, or can be provided with any other drive such as electric, hydraulic, pneumatic or internal combustion drive or can be manually operated such as with a hand crank.

Referring hack to FIGS. 2A and 2B, the capstan arrangement 20 includes a guiding member 58 disposed at the aerostats side 22a thereof, through which the cable 12 extends towards the aerostats. The guiding member 58 can be configured to urge the cable 12 towards the first head 24a and towards the first guide 27 thereon precluding thereby tangled segments of the cable 12 from being formed in the capstan arrangement 20.

According to an example the guiding member 58 can include a main wheel 59a and an auxiliary wheel 59b mounted at the aerostats side 22a, such that the cable 12 extends between a circumferential surface of the main wheel 59a and that of the auxiliary wheel 59b.

The capstan arrangement 20 can further include a tension sensor 60 mounted at the aerostats side 22a thereof, and being configured for measuring the input tension. The tension sensor 60 can include a roller wheel 62 mounted between the guiding member 58 and the first head 24a, such that the cable 12 extending between the guiding member 58 and the first head 24a engages a circumferential surface thereof. It is appreciated that in order to allow the tension from the cable 12 to be loaded on the circumferential surface of the roller wheel 62, the latter is disposed with respect the guiding member 58, such that the cable 12 is sidewardly displaced by the circumferential surface thereof. For example, the roller wheel 62 can be mounted underneath the main wheel 59a of the guiding member 58 while the auxiliary wheel 59b is mounted on a first side of the main wheel 59a. The cable 12 can be extended between the main wheel 59a and the auxiliary wheel 59b and then can be displaced sidewardly to engage a circumferential surface of the roller wheel 62 disposed below a second side of the main wheel 59a. This way, that the sensor 60 can receive an indication regarding the input tension of the cable 12.

It is appreciated that the capstan arrangement 20 can includes a braking mechanism (not shown) configured to prevent an undesired unwinding of the cable. The braking mechanism can include a solenoid brake, a mechanical brake or ratchet and pawl device, etc.

As indicated hereinabove the system 10 further includes a spool drum 30 configured for wrapping therearound a segment 14 of the cable 12 extending from the drum side 22b of the capstan arrangement 20. The spool drum 30 defines a circumferential surface for wrapping the cable 12 thereon and includes a pair of flanges 32 each extend from one edge of the circumferential surface. It is appreciate that the flanges 32 can be configured to preclude displacement of segments of the cable 12 off the spool drum 30 and can thus be configured in accordance with the length of the cable 12 which the spool drum 30 is intended to collect.

The spool drum 30 can further include a drum guide 34 configured to direct the cable 12 such that it is aligned with the circumferential surface of the spool drum 30. The drum guide 34 can include a guiding wheel 35 disposed such that the segment 14 of the cable 12 extending from the drum side 22b of the capstan arrangement 20 engages a surface thereof and is directed towards the spool drum 30. The drum guide 34 can further include a pair of rollers 36 disposed such that cable 12 from the drum guide 34 extends therebetween and is urged to the desired location along the width of the circumferential surface of the spool drum 30.

The system 10 further includes a second drive mechanism 70 configured to rotate the spool drum 30 such that the cable 12 is pulled from the drum side 22b of the capstan arrangement 20. The second drive mechanism 70, here illustrated as a motor, is configured to operate in varying forces such that the spool drum 30 maintains a predetermined tension of a segment 14 of the cable 12 disposed between the spool drum 30 and the drum side 22b of the capstan arrangement 20.

As indicated hereinabove, the winch system 10 can be operated in a releasing mode in which the cable is released allow the aerostats to be elevated, and a pulling mode in which the cable 12 and consequently the aerostats are downwardly pulled towards the system.

Accordingly, the capstan arrangement 20 is configured in releasing mode in which the cable 12 is let out towards the aerostats, and a pulling mode in which the cable is pulled in towards the spool drum. The first drive 50 is thus configured to rotate the first and second heads 24a and 24b in a first direction such that the cable 12 is pulled and in a second direction such that the cable 12 is released.

The second drive mechanism 70 is, however, configured to rotate the spool drum 30 in both the releasing mode and in pulling mode in the same direction, i.e. in a counter direction to the direction of the tension exerted on the cable. This way, the segment 14 of the cable 12 extending from the drum side 22b of the capstan arrangement 20 is pulled and a predetermined tension thereof is maintained in both the releasing mode and in pulling mode.

It is appreciated that the second drive mechanism 70 can be configured to drive the spool drum 30 in varying forces in accordance with the mode of operation, the speed of the first drive mechanism 50, and the tension measured by the tension sensor 60. That is to say, in the pulling mode the second drive mechanism 70 is configured to operate such that it is rotated at a relatively high speed allowing thereby the cable 12 to be wrapped around the spool drum 30.

In the releasing mode, on the other hand, the cable is pulled off of the spool drum 30, the spool drum 30 is thus rotated in the direction of the tension forces exerted by the cable and conforming to the direction of the rotation of the capstan arrangement 20. In this mode the second drive mechanism 70 however, exerts counterforces on the spool drum 30 such that the rotation of the spool drum 30 to release the cable 12 is restrained. Accordingly, in the releasing mode the second drive mechanism 70 operates at a relatively low speed, such that the spool drum 30 can rotate to release the cable 12, however the tension segment 14 of the cable 12 is still maintained.

This way, when the aerostats is elevated the a capstan arrangement 20 is activated allowing the cable 12 to be released, and the spool drum 30 is rotated by the second drive mechanism 70 in an opposite direction such that the tension in the segment 14 of the cable 12 disposed between the spool drum 30 and the capstan arrangement 20 is maintained. When the aerostats is lowered the capstan arrangement 20 is activated in a pulling direction pulling thereby the cable 12. The spool drum 30 is rotated by the second drive mechanism 70 in the same pulling direction such that the tension in the segment 14 of the cable 12 disposed between the spool drum 30 and the capstan arrangement 20 is maintained.

It is appreciated that the second drive mechanism 70 can be configured to operate in the releasing mode only in response to a drop of the tension of the segment 14 of the cable 12 below a predefined threshold.

According to an example, the first and second heads 24a and 24b, the main wheel 59a and the auxiliary wheel 59b are consecutively mounted on an elongated frame member 65. The frame member 65 can extend upwardly in the direction of the cable 12, i.e in the direction of the aerostats coupled to the cable 12. The frame member 65 can be configured to allow a certain degree of up and down rotation, such that the direction of the frame can be adjusted in accordance with the location of the aerostats.

In addition, both the capstan arrangement 20 and the spool drum 30 are mounted on body 67 which can be mounted on a rotational mount 69 configured to allow horizontal rotation of the system 10 about a vertical axis in 360° or less. This way the system 10 can follow movement of the aerostats and the cable 12.

According to an example the system 10, can be configured as a portable system and can thus be mounted over, a foldable structure 90. The foldable structure 90 can include telescopic stabling legs 92 sideward extending from one or more sides of the foldable structure 90 providing thereby stability to the system 10.

According to an example, the power source 80, such as batteries, can be mounted between the stabling legs 92, such that the weight thereof provide additional stability to the system 10. Alternatively, the system 10 can include a weight mounted between the stabling legs 92, or at other locations providing stability to the system.

Those skilled in the art to which the presently disclosed subject matter pertains will readily appreciate that numerous changes, variations, and modifications can be made without departing from the scope of the invention, mutatis mutandis.

The invention claimed is:

1. A winch system for controlling the elevation of an aerostats restrained by a cable the system comprising:
a capstan arrangement configured for reducing the tension in a segment of a cable extending between an aerostats side and a drum side thereof;
a spool drum configured for wrapping therearound a segment of the cable extending from said drum side of said capstan arrangement;
a first drive mechanism configured to selectively activate said capstan arrangement in a released mode, in which the cable is let out towards the aerostats, and a pulling mode in which the cable is pulled in towards the spool drum; and,
a second drive mechanism configured to rotate the spool drum in said released mode and in said pulling mode such that the segment of the cable extending from said drum side of said capstan arrangement is pulled in a counter direction to the direction of the tension exerted on the cable;
wherein said capstan arrangement includes a dual capstan head having a first head and a second head each having a circumferential surface configured to allow winding the cable thereon, and said first head is mounted on a first shaft disposed in parallel with a second shaft on which said second head is mounted and said first drive in said released mode is configured to rotate said first and second heads in a first direction such that the cable is released, and in said pulling mode is configured to rotate said first and second heads in a second direction such that the cable is pulled and said capstan arrangement includes a guiding member disposed at side aerostats side thereof, through which the cable extends towards the aerostats, said guiding member being configured to urge the cable towards a first guide of said first head.

2. A winch system according to claim 1 wherein said capstan arrangement includes said aerostats side through which said cable extends towards the aerostats and said drum side through which the cable extends towards said spool drum.

3. A winch system according to claim 1 wherein said first and second heads are consecutively mounted on an elongated frame member extending upwardly in the direction of the cable and is configured to allow an up and down rotation, such that direction of said frame is adjustable in accordance with the location of the aerostats.

4. A winch system according to claim 1 wherein varying forces are set in accordance with said released mode and said pulling mode, the rotational speed of said first drive mechanism, and a tension measured by a tension sensor.

5. A winch system according to claim 1 wherein said first and second heads include a plurality of guides defined along said circumferential surface, each guide is configured to allow a single cable binding therein.

6. A winch system according to claim 5 wherein each of said first and second heads further includes side flanges defined on each edge of said circumferential surface and a roller disposed between said side flanges and configured to engage the cable wound over said circumferential surface, forcing thereby each binding of the cable into one of said guides.

7. A winch system according to claim 6 wherein said guide includes a main wheel and an auxiliary wheel mounted such that the cable extends between a circumferential surface of said main wheel and that of said auxiliary wheel.

8. A winch system according to claim 1 wherein said capstan arrangement further includes a tension sensor configured for measuring an input tension of said cable at said aerostats side thereof.

9. A winch system according to claim 1 wherein said spool dram includes a circumferential surface for wrapping the cable thereon and includes a pair of flanges each extend from one edge of the circumferential surface.

10. A winch system according to claim 9 wherein said spool drum further includes a drum guide configured to direct the cable such that it is aligned with said circumferential surface of said spool drum.

11. A winch system according to claim 10 wherein said drum guide includes a guiding wheel disposed such that a segment of said cable extending from said drum side of said capstan arrangement engages a surface thereof and is directed towards said spool drum.

12. A winch system according to claim 1 wherein said second drive mechanism is configured to operate in varying forces such that said spool drum maintains a predetermined tension of a segment of the cable disposed between said spool drum and said drum side of said capstan arrangement.

13. A winch system according to claim 1 wherein said segment of the cable is pulled such that a predetermined tension thereof is maintained in said released mode and in said pulling mode.

14. A winch system according to claim 1 wherein in said pulling mode said second drive mechanism is configured to operate such that the cable is wrapped around said spool drum, and in said released mode said spool drum is rotated in the direction of the tension forces exerted by the cable.

15. A winch system according to claim 1 wherein in said released mode said second drive mechanism exerts counterforces on said spool drum such that rotation of said spool drum to release the cable is restrained.

16. A winch system according to claim 15 wherein said second drive mechanism is configured to operate in said released mode only in response to a drop of the tension in said segment below a predefined threshold.

17. A winch system according to claim 1 wherein said capstan arrangement and said spool drum are mounted on a rotational mount configured to allow horizontal rotation.

18. A winch system for controlling the elevation of an aerostats restrained by a cable the system comprising:
- a capstan arrangement configured for reducing the tension in a segment of a cable extending between an aerostats side and a drum side thereof;
- a spool drum configured for wrapping therearound a segment of the cable extending from said drum side of said capstan arrangement;
- a first drive mechanism configured to selectively activate said capstan arrangement in a released mode, in which the cable is let out towards the aerostats, and a pulling mode in which the cable is pulled in towards the spool drum; and,
- a second drive mechanism configured to rotate the spool drum in said released mode and in said pulling mode such that the segment of the cable extending from said drum side of said capstan arrangement is pulled in a counter direction to the direction of the tension exerted on the cable;

wherein said capstan arrangement includes a dual capstan head having a first head and a second head each having a circumferential surface configured to allow winding the cable thereon, wherein said first head is mounted on a first shaft disposed in parallel with a second shaft on which said second head is mounted, and said first drive in said released mode is configured to rotate said first and second heads in a first direction such that the cable is pulled, and in said pulling mode is configured to rotate said first and second heads in a second direction such that the cable is released, and each of said first and second heads further includes side flanges defined on each edge of said circumferential surface and a roller disposed between said side flanges and configured to engage the cable wound over said circumferential surface, forcing thereby each binding of the cable into one of said guides, and said guiding member includes a main wheel and an auxiliary wheel mounted such that the cable extends between a circumferential surface of said main wheel and that of said auxiliary wheel.

19. A winch system for controlling the elevation of an aerostats restrained by a cable the system comprising:
- a capstan arrangement configured for reducing the tension in a segment of a cable extending between an aerostats side and a drum side thereof;
- a spool drum configured for wrapping therearound a semen of the cable extending from said drum side of said capstan arrangement;
- a first drive mechanism configured to selectively activate said capstan arrangement in a released mode, in which the cable is let out towards the aerostats, and a pulling mode in which the cable is pulled in towards the spool drum; and,
- a second drive mechanism configured to rotate the spool drum in said released mode and in said pulling mode such that the segment of the cable extending from said drum side of said capstan arrangement is pulled in a counter direction to the direction of the tension exerted on the cable;

wherein in said released mode said second drive mechanism exerts counterforces on said spool drum such that rotation of said spool drum to release the cable is restrained, and said second drive mechanism is configured to operate in said released mode only in response to a drop of the tension in said segment below a predefined threshold.

20. A winch system fir controlling the elevation of an aerostats restrained by a cable the system comprising:
- a capstan arrangement configured for reducing the tension in a segment of a cable extending between an aerostats side and a drum side thereof;
- a spool drum configured for wrapping therearound a segment of the cable extending from said drum side of said capstan arrangement;
- a first drive mechanism configured to selectively activate said capstan arrangement in a released mode, in which the cable is let out towards the aerostats, and a pulling mode in which the cable is pulled in towards the spool drum; and,
- a second drive mechanism configured to rotate the spool drum in said released mode and in said pulling mode such that the segment of the cable extending from said drum side of said capstan arrangement is pulled in a counter direction to the direction of the tension exerted on the cable;

wherein said capstan arrangement and said spool drum are mounted on a rotational mount configured to allow horizontal rotation.

* * * * *